J. L. ESTELL.
WEED CUTTER.
APPLICATION FILED AUG. 18, 1917.

1,267,645.

Patented May 28, 1918.

INVENTOR
John L. Estell
BY Milo B. Stevens Co.
ATTORNEYS

UNITED STATES PATENT OFFICE.

JOHN L. ESTELL, OF REED, OKLAHOMA.

WEED-CUTTER.

1,267,645.  Specification of Letters Patent.  Patented May 28, 1918.

Application filed August 18, 1917. Serial No. 186,949.

*To all whom it may concern:*

Be it known that I, JOHN L. ESTELL, a citizen of the United States, residing at Reed, in the county of Greer and State of Oklahoma, have invented new and useful Improvements in Weed-Cutters, of which the following is a specification.

This invention relates to implements for destroying weeds among growing crops, and more particularly an implement which is drawn between the rows of plants and which has outstanding cutting blades which run close to or into the ground to cut the weeds.

The invention has for its object to provide a novel and improved support and adjusting means for the cutting blades, and to this end it consists in a combination and arrangement of parts to be hereinafter described and claimed, reference being had to the accompanying drawing.

Figure 1:
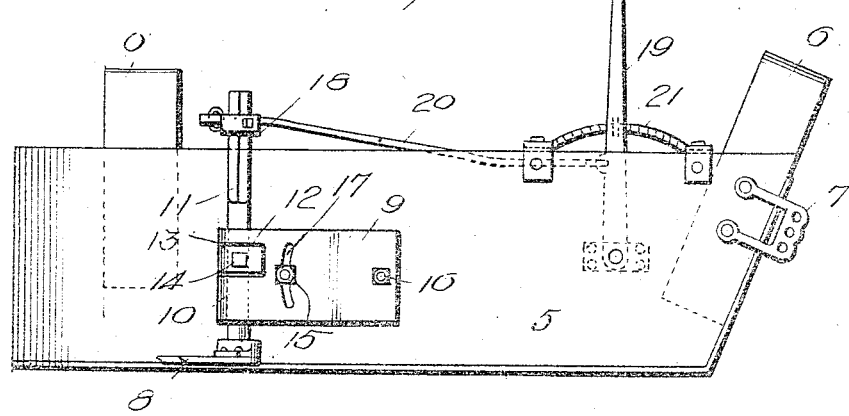
Figure 1 is a side elevation of the implement.
Figure 2:
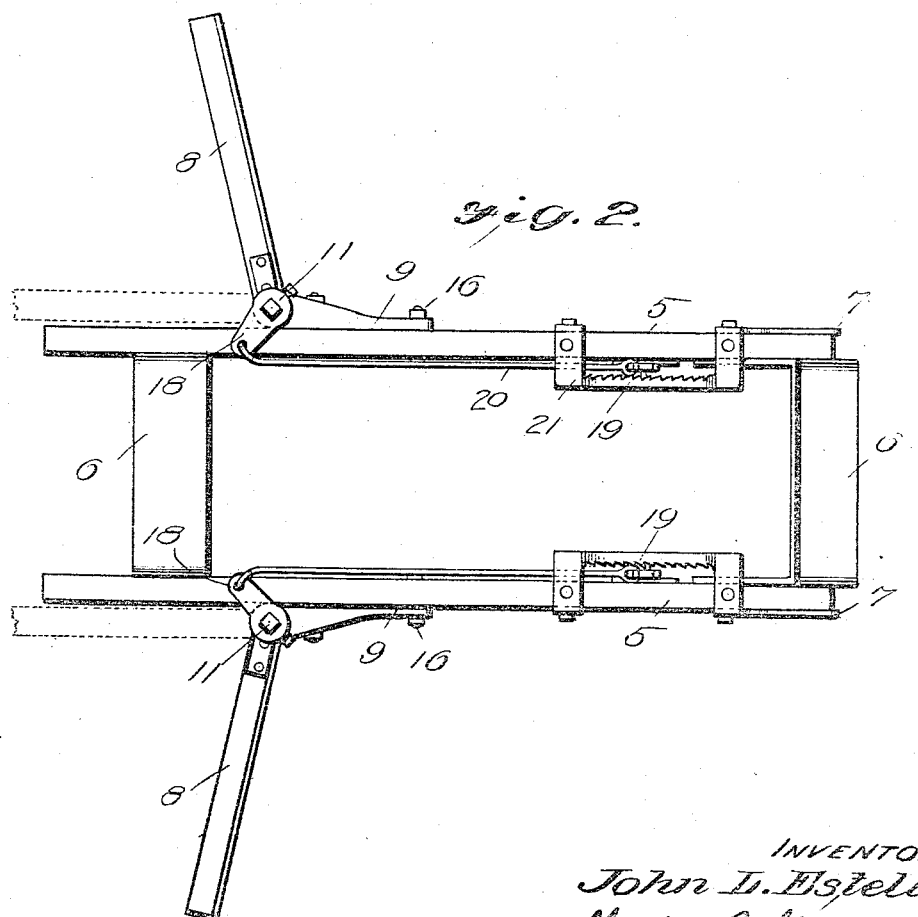
Fig. 2 is a plan view thereof.

Referring specifically to the drawing, the supporting frame of the implement comprises two laterally spaced runners 5 rigidly connected in parallelism by arched cross members 6, and having fastened to their forward ends clevises 7 for attachment of the draft animals. Each runner carries an elongated cutting blade 8, which latter, when in operative position, extends laterally and outward from the runner at an oblique angle to make a draw cut. The blade may have one or both of its edges sharpened. If both edges are sharpened, the blade may be reversed when one edge becomes dulled.

Each blade 8 is supported by the following means:

On the outer face of each runner 5 is mounted a plate 9 having at one end a vertical bearing or hinge knuckle 10 in which is rotatably mounted a vertical stem or shank 11. This end of the plate also has an edge recess 12 which intersects the bearing aperture. On the stem 11 is fixed a collar 13 which seats in the recess 12 and prevents vertical displacement of the stem. The collar is held on the stem by a set screw 14, and upon releasing the latter, the stem may be slipped up or down in the bearing to regulate the height of the blade 8, the latter being thus vertically adjustable.

The plate 9 is also adjustably mounted on the runner 5 for the purpose of setting the blade 8 at an angle or inclination to the surface of the ground, so that when it is lowered sufficiently, it enters the ground and cuts the weeds around the roots. The adjustable mounting of the plate 9 is obtained by fastening the same to the runner by two bolts 15 and 16, respectively, and providing the plate with a curved slot 17 for the bolt 15, the curve of the slot being on an arc having the bolt 16 for its center.

The upper end of the stem 11 is squared and to said end is fitted a laterally and inwardly extending crank arm 18. On the inner side of the runner 5 is fulcrumed a hand lever 19 connected by a link 20 to the crank arm 18. A suitable rack 21 is provided for locking the hand lever 19.

The stem 11 is free to turn in the bearing 10, and hence it will be seen that when the hand lever 19 is operated the blade 8 is swung so that it can be readily set to extend outward at the desired cutting angle. When the implement is drawn to or from the field, the blades will be retracted, or swung rearward to lie closely alongside the runners, as shown dotted in Fig. 1.

The hereinbefore described adjustments can be readily made, and the implement is therefore easily controlled, and it is also simple in construction and efficient in operation.

I claim:—

A weed cutter comprising a portable supporting frame, a bearing plate mounted on the side of the frame and adjustable to position the bearing at different angles to the vertical, said plate having an edge recess intersecting the bearing, a stem rotatably mounted in the bearing and adjustable vertically therein, a set collar on the stem and seating in the aforesaid recess, an elongated cutting blade carried by the stem and extending outward therefrom, and means for locking the stem against turning in the bearing.

In testimony whereof I affix my signature.

JOHN L. ESTELL.

Copies of this patent may be obtained for five cents each, by addressing the "Commissioner of Patents, Washington, D. C."